United States Patent [19]

Ichikawa et al.

[11] Patent Number: 5,143,585
[45] Date of Patent: Sep. 1, 1992

[54] METHOD OF REMOVING ORGANIC SOLVENTS

[75] Inventors: Kazuyoshi Ichikawa; Shinichi Suzuki; Sanae Oyama; Hideaki Kimura, all of Hino, Japan

[73] Assignee: Konica Corporation, Tokyo, Japan

[21] Appl. No.: 407,923

[22] Filed: Sep. 15, 1989

[30] Foreign Application Priority Data

Sep. 20, 1988 [JP] Japan .............................. 63-235700
Sep. 28, 1988 [JP] Japan .............................. 63-243582

[51] Int. Cl.$^5$ ...................... B01D 3/10; B01D 3/34; B01D 3/42
[52] U.S. Cl. ........................... 203/2; 159/47.1; 159/DIG. 16; 203/60; 203/61; 203/62; 203/63; 203/58; 203/91; 203/DIG. 21; 560/248
[58] Field of Search ........ 203/91, 2, 58, 60, DIG. 21, 203/61, 62, 63, 91, DIG. 18, 68, 28; 159/47.1, DIG. 16; 560/248; 210/767

[56] References Cited

U.S. PATENT DOCUMENTS

| | | | |
|---|---|---|---|
| 3,635,800 | 1/1972 | Rodger et al. | 202/236 |
| 3,741,272 | 6/1973 | Ullrich et al. | 159/49 |
| 3,750,735 | 8/1973 | Chiang et al. | 159/DIG. 27 |
| 4,234,392 | 11/1980 | Tada et al. | 203/91 |
| 4,269,664 | 5/1981 | Younger | 203/91 |
| 4,366,030 | 12/1982 | Anderson | 202/196 |
| 4,613,412 | 9/1986 | McDermid | 203/DIG. 14 |
| 4,731,320 | 3/1988 | Sasaki et al. | 430/553 |
| 4,810,274 | 3/1989 | Cheng et al. | 62/12 |

FOREIGN PATENT DOCUMENTS 0070841 5/1985 Japan ........................... 159/47.3

Primary Examiner—Virginia Manoharan
Attorney, Agent, or Firm—Jordan B. Bierman

[57] ABSTRACT

An organic solvent having a boiling point lower than that of water is removed from liquid containig water and the organic solvent contained in a tank by exhausting air in the tank, wherein an air pressure in the tank is kept about vapor pressure level of the liquid.

15 Claims, 4 Drawing Sheets

METHOD OF REMOVING ORGANIC SOLVENTS

FIELD OF THE INVENTION

This invention relates to a method of removing organic solvents when preparing an oil-in-water type emulsion for producing, for example, photographic light-sensitive articles.

BACKGROUND OF THE INVENTION

This kind of oil-in-water type emulsions have widely been used for manufacturing toilet articles, foods, paints, and chemical products, as well as photographic light-sensitive articles.

In the photographic light-sensitive articles, for example, an emulsified material has been prepared in such a manner that an oil-soluble material such as a color image forming compound that is so-called a coupler, a diffusion-transfer compound, a color-fogging preventive, a color-fading preventive, a color-mixing preventive, a UV-absorbent, or a color-thickening agent, is dispersed in an aqueous solution of a high-molecular substance such as gelatin. Such oil-in-water type emulsified materials comprising the above-given oil-soluble materials have usually been prepared in the following manner. First, an oil-phase solution is prepared by dissolving an oil-soluble material in an organic solvent. The resulting oil-phase solution is then added onto the liquid-level of a aqueous-phase solution containing a water-soluble high-molecular substance, by making use of an emulsifying aid if required, and is then so dispersed as to be emulsified. In this way, an oil-soluble material-containing oil-in-water type emulsified material having an average grain-size of approximately 0.1 to 1.0 $\mu$m may be prepared.

The solvents such as ethyl acetate each having a boiling point lower than that of water, which have been used often in such a process as described above, will become unnecessary after the time when the dispersion is completed. In many cases, therefore, such solvents are removed from an emulsifying tank by reducing the air-pressure in the tank by means of a vacuum pump connected to the tank.

When producing photographic light-sensitive articles, an emulsified dispersion liquid often shows a behavior of forming bubbles.

The emulsifying tank is therefore filled with bubbles so as not to smoothly remove the solvents, because the bubbles will reduce the evaporative surface areas and, along therewith, the bubbles will invade inside the exhaust pipe when the solvents are to be removed by reducing the air-pressure in the tank, so that a big loss may be caused and the exhaust pipe should be cleaned every time when completing an emulsification-dispersion step.

There have been well-known methods of eliminating the production of bubbles, namely; <1> a method in which a rotary blade which is the so-called bubble-breaker is to be provided inside a liquid tank or exhaust pipe; <2> another method in which a tank capacity is to be made far larger relatively to the amount of processing solution to be used; and <3> a further method in which a debubbling agent is to be used.

However, in method <1>, the bubbles adhering to the rotary blade should be cleaned up in due course, and such cleaning requires a lot of trouble. In method <2>, not only the installation space and facility cost will be increased, but also the bubbles adhering to the tank will be a loss. And, in method <3>, there are still problems remaining unsolved, such as a bad influence exerted, by mixing a debubbling agent into emulsions, on the characteristics of the emulsified materials including particularly those for photographic light-sensitive articles which require strict quality.

SUMMARY OF THE INVENTION

It is one of the principal objects of the invention to provide a method of removing organic solvents, wherein the above-described bubbling troubles and other various problems raised along therewith can be solved and the solvent removing efficiency can be remarkably high especially when removing the solvent from a solution containing water and an organic solvent having a boiling point lower than that of water.

The tank containing an oil-in-water type emulsified liquid is air-exhausted through a pressure-reduced exhaust pipe being connected to the tank. When exhausting the air from the tank, the organic solvents are removed by changing the air-pressure in the tank so as to correspond to the changes of the vapor pressure of the liquid in the tank and, more preferably, by fluctuating the air-pressure in the tank, with a short period, about the vapor pressure level of the liquid in the tank.

While the organic solvents are being removed in a pressure-reduction and distillation method, the emulsified liquid temperature is gradually lowered with the increase in latent heat generated by vaporizing the organic solvents, and the vapor pressure of the liquid is also lowered.

Nevertheless, if keeping on with the pressure-reduction and distillation under a constant negative pressure, the organic solvents may be partly removed at the initial stage. However, as the vapor pressure of the liquid is lowered, the difference between the initially set pressure and the lowered vapor pressure will become greater to reduce the amount of the organic solvents vaporized, so that the efficiency of removing the solvents may resultingly be lowered. It may, therefore, be considered to lower such a set pressure from the beginning on. In this case, however, bubbles will be produced so seriously to carry them into the exhaust pipe.

In the method according to the invention, on the contrary, when the air-pressure in the tank containing the liquid is adjusted to follow in the fluctuations of the vapor pressure of the liquid, the production of bubbles can be prevented, so that the problems such as described above can be solved.

When the air-pressure in the tank is fluctuated about the vapor pressure level of the liquid, the bubbles having once been produced by the increased reduction of pressure will be broken by the decreased reduction of pressure, so that the bubble production can substantially be prevented. Different from the case where the reduction of pressure is so limited as to minimize the production of bubbles with sacrificing the efficiency of removing solvents, in the case of the method of the invention, the efficiency of removing solvents can be very higher, because bubbles can be eliminated even if the reduction of pressure is increased to some extent.

Figure 1:
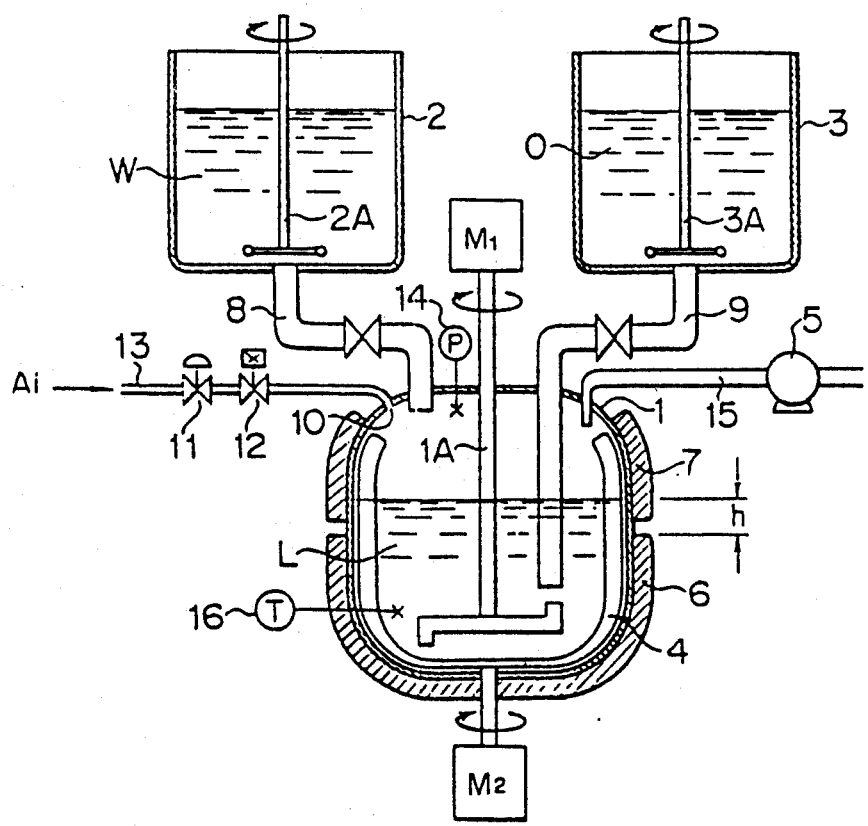
FIG. 1 is a schematic illustration of an emulsifying apparatus of the invention.

In the drawings, 1 ... Emulsifying tank; 2 ... Aqueous-phase preparing tank; 3 ... Oil-phase preparing tank; 5 ... Vacuum pump; 10 ... Fresh-air inlet; 11 ... Inlet-flow adjuster valve; 12 ... Pressure-control valve; 14 ... Pressure gauge; and 15 ... Pressure-reduced exhaust pipe.

DETAILED DESCRIPTION OF THE INVENTION

In the invention, the air-pressures in a tank is so adjusted as to be within the range of ±20 mmHg, desirably ±10 mmHg and, more preferably ±5 mmHg so that the tank pressure may follow in the fluctuations of the vapor pressure of an oil-in-water type dispersion liquid, in the course of removing organic solvents.

In one of the embodiments of the invention, the air-pressure in a tank is multitudinously fluctuated in a short time-period, desirably in a period of every 5 second or shorter, more preferably in a period of every 3 second or shorter and, further preferably in a period of every 2 second or shorter. The fluctuation range of the pressures should preferably be within the range of ±2 to 20 mmHg.

Another example of the method of controlling the above-mentioned pressure, besides the method of repeatedly introducing a small amount of the air and stopping the introduction thereof, is that a reduced-pressure air-exhaust capacity is changed in a short time-period by inverter-controlling a vacuum pump, for example.

Next, referring to the apparatus example shown in FIG. 1, aqueous-phase preparing tank 2 and oil-phase preparing tank 3 are provided to the upper side of built-in jacket type emulsifying tank 1. These tanks 1, 2 and 3 are provided with high-speed stirrer 1A and stirrers 2A and 3A, respectively. High-speed stirrer 1A may be of any of the types such as a dissolver, a paddle, a propeller, or homomixer. It is desirable to arrange to the inside of emulsifying tank 1 with freely rotatable film-interface scraper 4 having a clearance of not wider than 1 cm between the scraper and the inner wall of the tank. It is also allowed that the inside of emulsifying tank 1 may be used for preparing an aqueous-phase without using aqueous-phase preparing tank 2.

The upper side of emulsifying tank 1 is tightly closed, except that open-air inlet 10 and vacuum pump 5 are connected thereto. Open-air inlet 10 is connected with open-air inlet pipe 13 attached with open-air flow introduction adjusting valve 11 and air-pressure control valve 12 having an electromagnetic valve. Reference numerals 14 and 16 are a pressure gauge and a liquid thermometer, respectively.

In such an apparatus as described above, for example, an aqueous-phase solution and an oil-phase solution are prepared in aqueous-phase preparing tank 2 and oil-phase preparing tank 3, respectively, and the resulting aqueous-phase solution W in a specific amount is then supplied into emulsifying tank 1, through supplying pipe 8. Then, while rotating high-speed stirrer 1A, the resulting oil-phase solution O is supplied, at a supplying rate, desirably, within the range of 30 to 45 liter per meter, into the aqueous-phase solution in emulsifying tank 1 through pipe 9 for supplying solution O into the aqueous-phase solution.

After then, the oil-phase solution is stirred by the high-speed stirrer preferably being kept at a higher rotation rate ultimately until the solution can be an emulsified liquid having a desired particle-size.

Such an emulsified liquid may be used provided that the viscosity thereof is not less than 1000 cp when it is emulsified completely.

Such a viscosity as mentioned above may be measured with a B type viscometer and should be within the range of, desirably, 3000 to 100,000 cp and, particularly, 5000 to 50,000 cp. In a certain prescribed liquid composition, such a viscosity may be obtained by adjusting the proportion of an oil-phase solution to an aqueous-phase solution, an O/W ratio, or the concentration of a high-molecular substance such as gelatin.

From the final stage of the above-mentioned emulsification or after completing thereof, the operation of vacuum pump 5 is started to reduce the pressure in emulsifying tank 1 so that a solvent having a boiling point lower than that of water, such as ethyl acetate, may be removed. Along with the reduction of pressure, the vapor of the organic solvent vaporized from the liquid surface is sucked into pressure-reduced exhaust pipe 15 so as to be exhausted to the outside of the system.

When the air-pressure in the tank is getting lower than the vapor pressure of the emulsified liquid, very fine bubbles will be produced in the liquid. In one of the embodiments of the invention, the vapor pressure of an emulsified liquid may be detected by checking up the production of such bubbles, so that the air-pressure in a tank may be adjusted.

Upon setting flow introduction controlling valve 11 to a certain opening, pressure-control valve 12 is so opened and closed as to control the amount of the air being introduced, in the direction of arrow Ai so that the air-pressure in tank 1 may be followed in the vapor pressure fluctuations of the emulsified liquid L.

Besides the above-mentioned device, the air-pressure in the tank may also be controlled by adjusting the opening of flow introduction controlling valve 11.

From the viewpoints of preventing liquid L from producing bubbles and quickly removing organic solvents, it is preferable that the air-pressure in the tank should be within the range of ±20 mmHg of the vapor pressure of emulsified liquid L. It is more preferable that the air-pressure in the tank is always lower than the vapor pressure of the liquid.

Figure 2:
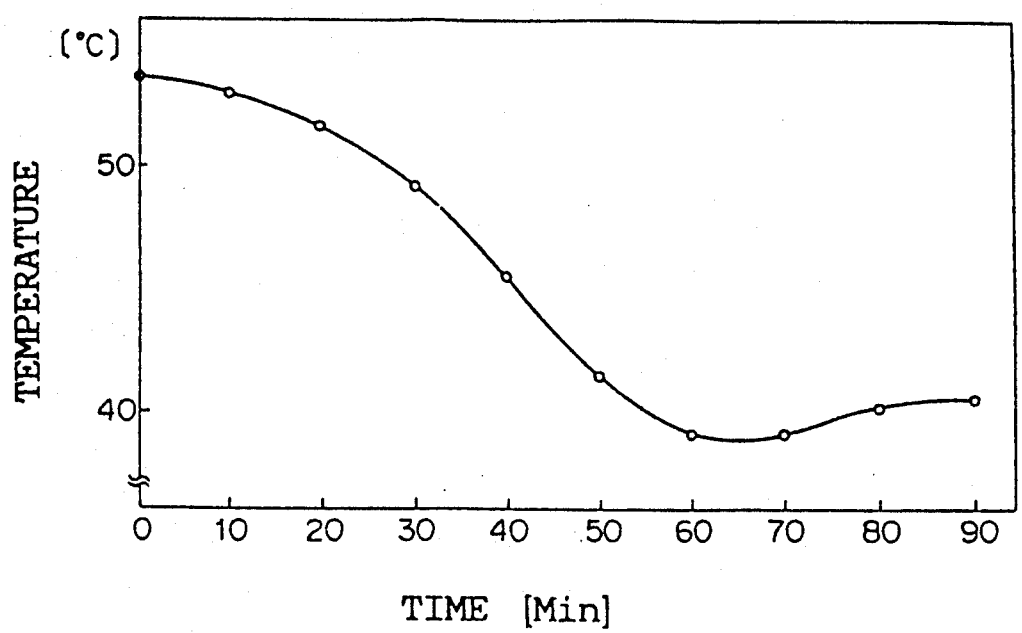
FIGS. 2 and 4 are the graphs each exhibiting the changes on standing in the temperatures of a liquid in the course of removing organic solvents under reduced pressure.
Figure 3:
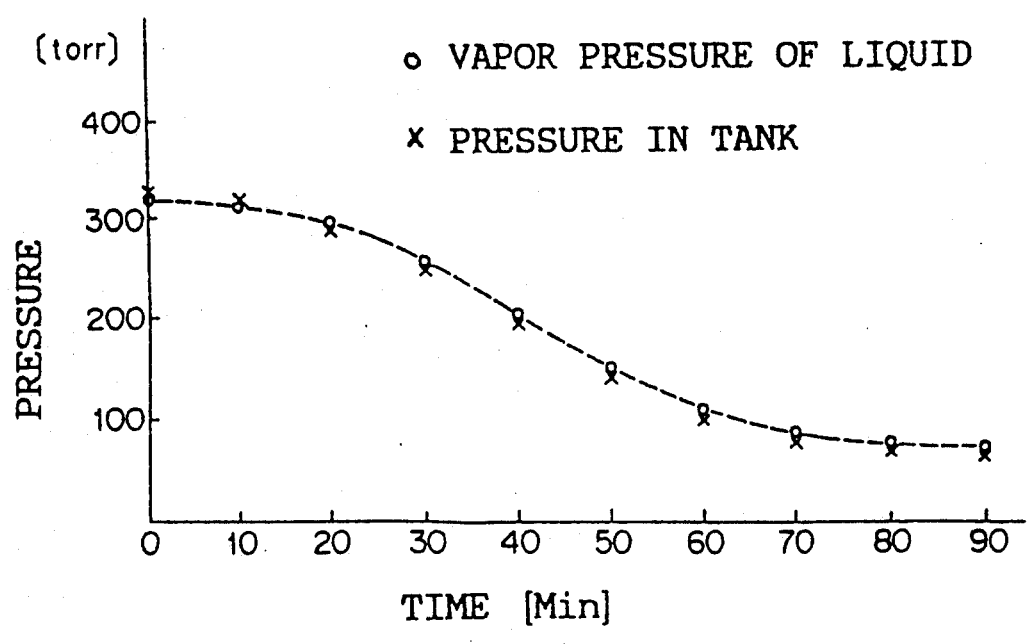
FIGS. 3 and 5 are the graphs each exhibiting the changes on standing in the vapor pressures of a liquid and the pressures in a tank.

FIG. 2 illustrates an example of the liquid temperature variations found in the embodiment of which will be described later. This figure proves that, even if constant heat is given from the exterior, the liquid temperature is getting lowered, due to the latent heat generated by the vaporization of the solvent, for a period of about 60 minutes after the time when an organic solvent removal is started. Accordingly, the vapor pressure of the liquid is also lowered as shown in FIG. 3. It may further be considered from FIG. 2 that the reason the liquid temperature is raised to some extent after about 60 minutes or so from the time when the solvent removal is started may be that the raises in both heat generated by a stirring operation and heat given through a jacket are faster than the lowering in the liquid temperature caused by the latent heat generated by vaporization.

On the other hand, In the process of making the pressure of the tank follow in the variations of the vapor pressure of the dispersed liquid, when fluctuating the pressure in the tank every short period of time, preferably, every period of not longer than 5 seconds, and the debubbling can be made more preferably when the pressure in the tank is fluctuated within the range of ±2 to 20 mmHg of the vapor pressure. The methods of achieving the above-mentioned purpose include, for example, such a method in which the aforementioned pressure control valve 12 is opened and closed in every short period of time.

Supposing that the vapor pressure of a liquid is 300 mmHg at a certain point of time and the pressure in the tank is changed, for example, from 305 mmHg to 295 mmHg, that is, the pressure of the tank is lower by 5 mmHg than the vapor pressure level, bubbles may be produced. Even after the bubbles are produced, when the pressure in the tank is raised from 295 mmHg to 305 mmHg, the bubbles will disappear due to the yield point of the pressure in the bubbles lower than the pressure in the tank. Even if the bubbles are produced, they can be made disappeared thereafter without delay.

In the above-described example, it is preferred to apply heat to emulsified liquid L so as to improve the emulsification-dispersion characteristics and to remove unnecessary solvents. It is also preferred to arrange a heating means such as heat-insulating jacket 6 pregnant with warm-water to a position lower than the liquid level of the emulsified liquid L and, it is more preferred to arrange it to a position lower than the liquid level by the distance h of at least 5 cm.

It is more preferred to provide, together with the heat-insulating jacket 6, a cooling means such as cooling jacket 7 capable of passing cool-water thereinside to an area covering both portions lower and upper than the liquid level, from the viewpoint of preventing the liquid level and the upper portion of the liquid level from being dried.

If occasion demands, it is allowed to separate heat-insulating jacket 6 and cooling jacket 7 from each other, in the direction of height or circumference. Water or other liquids may be used for a heating medium. A heater, for example, may also be used as a heat source.

There is no limitation to heating and cooling temperatures, provided, the heating and cooling temperatures are relatively higher and lower in the above-mentioned lower and upper portions, respectively. When using ethyl acetate as a solvent, it is preferred to set the heating and cooling temperatures to be within the ranges of 60° to 65° C. and 5° to 30° C., respectively.

This invention can be applied to a variety of oil-phase and aqueous-phase liquids and, in particular, suitably to the manufactures of the emulsified materials of photographic light-sensitive articles. Now, the detailed description thereof will be made.

The oil-soluble materials to be used when the invention is applied to the photographic articles include, for example, couplers, colored couplers, DIR couplers, DIR compounds, color-fog preventives, color-fading preventives, UV absorbents, and fluorescent brightening agents.

Water-soluble high-molecular compounds include, for example, gelatin, gelatin derivatives, graft-polymers of gelatin and other high molecular compounds, and a variety of synthetic hydrophilic high-molecular substances such as monomers or copolymers of polyvinyl alcohol, polyvinyl alcohol-partial acetal, poly-N-vinyl pyrolidone, polyacrylic acid, polymethacrylic acid, polyacrylamide, polyvinyl imidazole, and polyvinyl pyrazole.

Emulsifying aids applicable thereto include, for example, non-ionic surfactants such as saponin, alkylene oxide derivatives, e.g., polyethylene glycol, glycidol derivatives, e.g., alkenyl succinic polyglyceride and alkyl phenol polyglyceride, fatty acid esters of polyhydric alcohol and alkyl esters of sugar, urethanes or ethers thereof; anionic surfactants each containing acid group such as a carboxy, sulfo, phospho, sulfate or phosphate group, e.g., a triterpenoid type saponin, alkyl carboxylate, alkyl sulfonate, alkyl benzene sulfonate, alkyl naphthalene sulfonate, alkyl sulfate, alkyl phosphate, N-acyl-N-alkyl taurine, sulfosuccinate, sulfoalkyl polyoxyethylene alkylphenyl ether, or polyoxyethylene alkyl phosphate; amphoteric surfactants such as an amino acid, aminoalkyl sulfonate, aminoalkyl sulfate or phosphate, alkyl betaine, amineimide, or amine oxide; and cationic surfactants such as an alkyl amine salt, aliphatic or aromatic quaternary ammonium salt, heterocyclic quaternary ammonium salt, e.g., pyridinium or imidazolium, or phosphonium or sulfonium containing an aliphatic or heterocyclic ring.

EXAMPLE 1

Into an emulsifying tank having a capacity of 50 liters, 1.4 liters of a 10% sodium dodecylbenzene sulfonate solution, 3 kgs of photographic grade gelatin and 27 liters of water were poured in advance. With stirring the mixed solution, by revolving a 150-mm$\phi$-disk at 1500 rpm, the following oil-phase liquid was added thereinto at an adding rate of 37 liters per minute.

| | |
|---|---|
| 1-(2,4,6-trichlorophenyl)-3-[3-(2,4-di-t-aminophenoxyacetamido)benzamido]-5-pyrazolone | 3 kg. |
| Tricresyl phosphate | 3 kg. |
| Ethyl acetate | 6 liters |

After completing the above-mentioned addition, the revolving speed was increased to 4000 rpm and a further stirring was continued for 50 minutes, so that an oil-in-water type emulsified material was resulted.

Next, the ethyl acetate removal was commenced under reduced pressure by making use of the apparatus shown in FIG. 1. In the operations, pressure control valve 12 was constantly opened and an electric-drive type flow-introduction control valve 11 was used to serve as a tank pressure control valve. The tank pressures were controlled in accordance with the signals given from pressure gauge 14 and liquid thermometer 16.

The liquid temperatures, vapor pressures, and controlled pressures varied each in the course of removing ethyl acetate under reduced pressure are shown in FIGS. 2 and 3.

At the point of time of 90 minutes after commencing the removal of ethyl acetate under reduced pressure, the ratio of removing ethyl acetate was 99.2%, and there was not any bubbles adhered to the inside of the exhaust pipe even after the operations were completed.

COMPARATIVE EXAMPLE 1

The method of Example 1 was carried out except that the vapor pressure in the tank was reduced to 330 mmHg at the initial stage of removing the organic solvent and was thereafter maintained constant without control. The ratio of removing ethyl acetate was resulted in 68% at the point of 180 minutes after commencing the removal thereof under reduced pressure. It was further found after completing the operation that a number of bubbles adhered to the inside of the exhaust pipe in the tank.

EXAMPLE 2

The same procedures were taken as in Example 1, so that an oil-in-water type emulsified material.

Next, the removal of ethyl acetate was commenced under reduced pressure by making use of the apparatus shown in FIG. 1. In the operations, pressure control valve 12 was so controlled as to follow in the vapor pressure of the liquid and was, at the same time, forcibly fluctuated within the range of ±5 mmHg for every period of 2 second.

Figure 4:
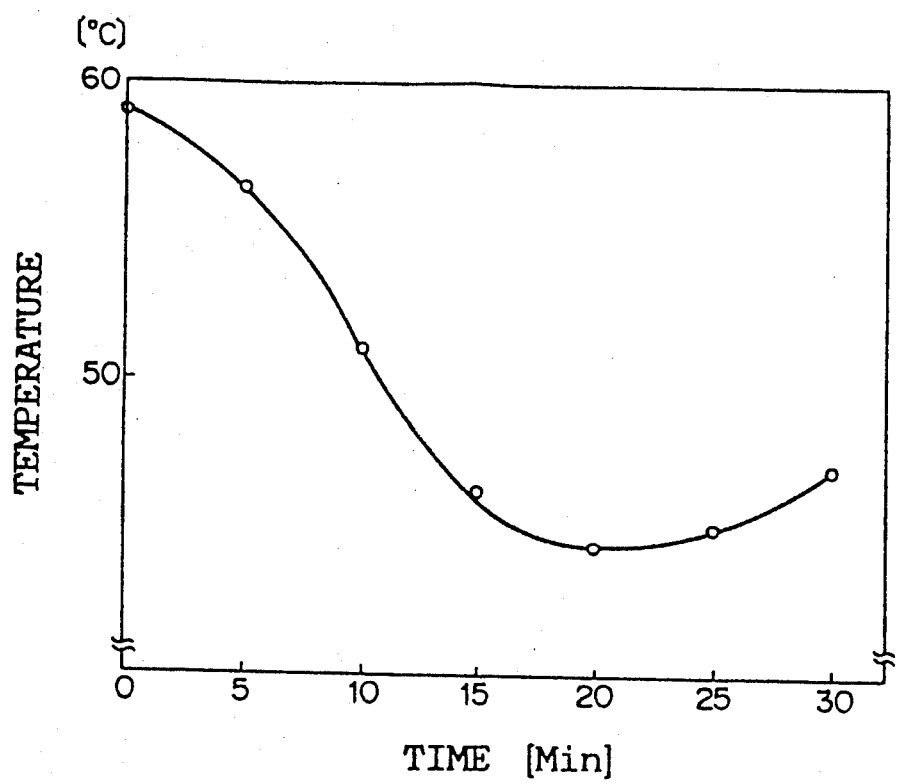
Figure 5:
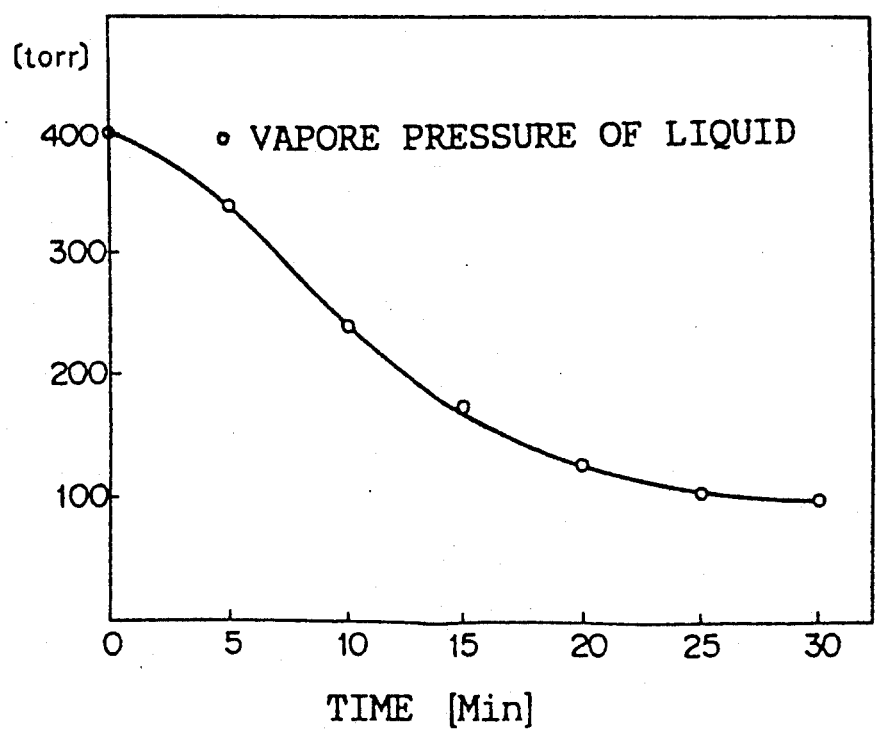
Figure 6:
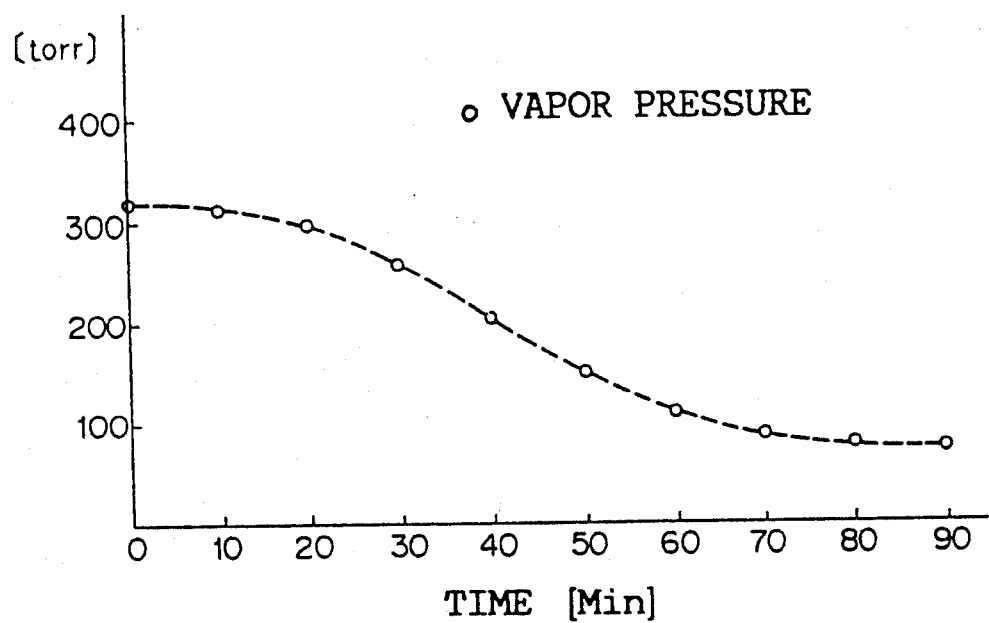

The liquid temperatures, and vapor pressures varied in the course of removing ethyl acetate under reduced pressure are shown in FIGS. 4 and 5. The amount of ethylacetate removed was 99.5% by 30 minutes after commencing the removal of ethyl acetate under reduced pressure. It was not found after completing the operations that bubbles adhered to both of the inner walls of the tank and the inside of the exhaust pipe.

COMPARATIVE EXAMPLE 2

The pressure in the tank was reduced to 100 mmHg by taking 30 minutes without carrying out any forcible pressure variation control at all. It was found that the exhaust pipe bore some bubble-mists company thereinside. For preventing such accompanied bubble-mists, the pressure in the tank was tried to be reduced to 100 mmHg so as to follow in the vapor pressure of the liquid. It was taken 90 minutes.

What is claimed is:

1. A method of removing, during distillation, an organic solvent having a boiling point below that of water from a liquid having a changing vapor pressure and containing water and an organic solvent, which liquid is contained in a tank, said method comprising removing air from said tank, adjusting an air pressure in said tank fluctuating within the range of 2 to 20 mmHg above and below said vapor pressure within a short period of time so that bubble formation can be substantially prevented 2. The method of removing organic solvent as claimed in claim 1 wherein said period is not over 5 seconds.

3. The method of claim 1 wherein said organic solvent is introduced into said water.

4. The method of claim 3 wherein said organic solvent is introduced at a velocity of 30 to 45 liters per minute.

5. The method of claim 3 wherein said liquid has a viscosity which is adjusted by introduction of a high molecular weight substance.

6. The method of claim 5 wherein said substance is gelatin.

7. The method of claim 5 wherein said substance is selected from the group consisting of gelatin, gelatin derivatives, graft polymers of gelatin; monomers or copolymers of polyvinyl alcohol, polyvinyl alcohol-partial acetal, poly-N-vinyl pyrolidone, polyacrylic acid, polymethacrylic acid, polyacylamide, polyvinyl imidazole, and polyvinyl pyrazole.

8. The method of claim 1 wherein said organic solvent and said water are mixed under agitation.

9. The method of claim 1 wherein said liquid has a viscosity of at least 1000 cp after emulsification.

10. The method of claim 9 wherein said viscosity is 3,000 to 100,000 cp.

11. The method of claim 10 wherein said viscosity is 5,000 to 50,000 cp.

12. The method of claim 9 wherein said viscosity is adjusted by varying the ratio of said organic solvent to said water.

13. The method of claim 1 wherein said liquid is heated.

14. The method of claim 1 wherein there is a heater below the surface of said liquid and a cooling jacket extending both above and below said surface.

15. The method of claim 14 wherein said organic solvent is ethyl acetate, said heater heats to a temperature of 60° to 65° C., and said cooling jacket cools to a temperature of 5° to 30° C.

* * * * *